US012620716B2

(12) United States Patent
Cheng et al.

(10) Patent No.: US 12,620,716 B2
(45) Date of Patent: May 5, 2026

(54) ANTENNA STRUCTURE

(71) Applicant: Quanta Computer Inc., Taoyuan (TW)

(72) Inventors: Chun-I Cheng, Taoyuan City (TW); Chung-Ting Hung, Taoyuan City (TW); Chin-Lung Tsai, Taoyuan City (TW); Ying-Cong Deng, Taoyuan City (TW)

(73) Assignee: QUANTA COMPUTER INC., Taoyuan City (TW)

( * ) Notice: Subject to any disclaimer, the term of this patent is extended or adjusted under 35 U.S.C. 154(b) by 77 days.

(21) Appl. No.: 18/924,013

(22) Filed: Oct. 23, 2024

(65) Prior Publication Data

US 2026/0066542 A1 Mar. 5, 2026

(30) Foreign Application Priority Data

Aug. 27, 2024 (TW) ................................ 113209247

(51) Int. Cl.

*H01Q 1/24* (2006.01)
*H01Q 1/48* (2006.01)
*H01Q 5/20* (2015.01)
*H01Q 9/04* (2006.01)

(52) U.S. Cl.

CPC ............. *H01Q 9/0421* (2013.01); *H01Q 1/48* (2013.01); *H01Q 5/20* (2015.01)

(58) Field of Classification Search

CPC .......... H01Q 9/0421; H01Q 5/20; H01Q 1/48; H01Q 1/241-243

See application file for complete search history.

(56) References Cited

U.S. PATENT DOCUMENTS

| | | | | |
|---|---|---|---|---|
| 9,992,312 | B1 * | 6/2018 | Deng | H04Q 1/24 |
| 12,308,530 | B2 * | 5/2025 | Lo | H01Q 5/371 |
| 2015/0123874 | A1 * | 5/2015 | Chan | H01Q 5/30 343/905 |
| 2021/0167491 | A1 * | 6/2021 | Chang | H01Q 1/48 |
| 2021/0218400 | A1 * | 7/2021 | Chen | H01Q 21/30 |
| 2024/0195082 | A1 * | 6/2024 | Lo | H01Q 5/378 |
| 2026/0011916 | A1 * | 1/2026 | Chang | H01Q 5/20 |

* cited by examiner

*Primary Examiner* — Awat M Salih

(74) *Attorney, Agent, or Firm* — McClure, Qualey & Rodack, LLP

(57) ABSTRACT

An antenna structure includes a ground element, a feeding radiation element, a first radiation element, a second radiation element, a third radiation element, a shorting radiation element, and a carrier element. The ground element includes a protruding portion. The feeding radiation element has a feeding point. The first radiation element is coupled to the feeding radiation element. The second radiation element is coupled to the first radiation element. The second radiation element is adjacent to the protruding portion of the ground element. The first radiation element and the second radiation element substantially extend in opposite directions. The third radiation element is coupled to the feeding radiation element. The third radiation element is adjacent to the first radiation element. The third radiation element is also coupled through the shorting radiation element to the ground element.

10 Claims, 4 Drawing Sheets

ANTENNA STRUCTURE

CROSS REFERENCE TO RELATED APPLICATIONS

This application claims priority of Taiwan Patent Application No. 113209247 filed on Aug. 27, 2024, the entirety of which is incorporated by reference herein.

BACKGROUND OF THE INVENTION

Field of the Invention

The disclosure generally relates to an antenna structure, and more particularly, to a wideband antenna structure.

Description of the Related Art

With the advancements being made in mobile communication technology, mobile devices such as portable computers, mobile phones, multimedia players, and other hybrid functional portable electronic devices have become more common. To satisfy consumer demand, mobile devices can usually perform wireless communication functions. Some devices cover a large wireless communication area; these include mobile phones using 2G, 3G, and LTE (Long Term Evolution) systems and using frequency bands of 700 MHz, 850 MHz, 900 MHz, 1800 MHz, 1900 MHz, 2100 MHz, 2300 MHz, and 2500 MHz. Some devices cover a small wireless communication area; these include mobile phones using Wi-Fi systems and using frequency bands of 2.4 GHz, 5.2 GHz, and 5.8 GHz.

Antennas are indispensable elements for wireless communication. If an antenna for signal reception and transmission has an insufficient operational bandwidth, it may degrade the communication quality of the relative mobile device. Accordingly, it has become a critical challenge for designers to design a small-size, wideband antenna structure.

BRIEF SUMMARY OF THE INVENTION

In an exemplary embodiment, the invention is directed to an antenna structure that includes a ground element, a feeding radiation element, a first radiation element, a second radiation element, a third radiation element, a shorting radiation element, and a carrier element. The ground element includes a protruding portion. The feeding radiation element has a feeding point. The first radiation element is coupled to the feeding radiation element. The second radiation element is coupled to the first radiation element. The second radiation element is adjacent to the protruding portion of the ground element. The first radiation element and the second radiation element substantially extend in opposite directions. The third radiation element is coupled to the feeding radiation element. The third radiation element is adjacent to the first radiation element. The third radiation element is also coupled through the shorting radiation element to the ground element. The ground element, the feeding radiation element, the first radiation element, the second radiation element, the third radiation element, and the shorting radiation element are disposed on the carrier element.

In some embodiments, the protruding portion of the ground element substantially has a rectangular shape.

In some embodiments, the combination of the feeding radiation element, the first radiation element, and the second radiation element substantially has a T-shape.

In some embodiments, the width of the first radiation element is greater than the width of the second radiation element.

In some embodiments, a first coupling gap is formed between the protruding portion of the ground element and the second radiation element. The width of the first coupling gap is from 0.5 mm to 1 mm.

In some embodiments, a second coupling gap is formed between the first radiation element and the third radiation element. The width of the second coupling gap is from 0.75 mm to 1.5 mm.

In some embodiments, the antenna structure covers a first frequency band and a second frequency band. The first frequency band is from 2400 MHz to 2500 MHz. The second frequency band is from 5150 MHz to 5850 MHz.

In some embodiments, the length of the first radiation element is substantially equal to 0.25 wavelength of the first frequency band.

In some embodiments, the length of the second radiation element is substantially equal to 0.25 wavelength of the second frequency band.

In some embodiments, the length of the third radiation element is substantially equal to 0.5 wavelength of the second frequency band.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
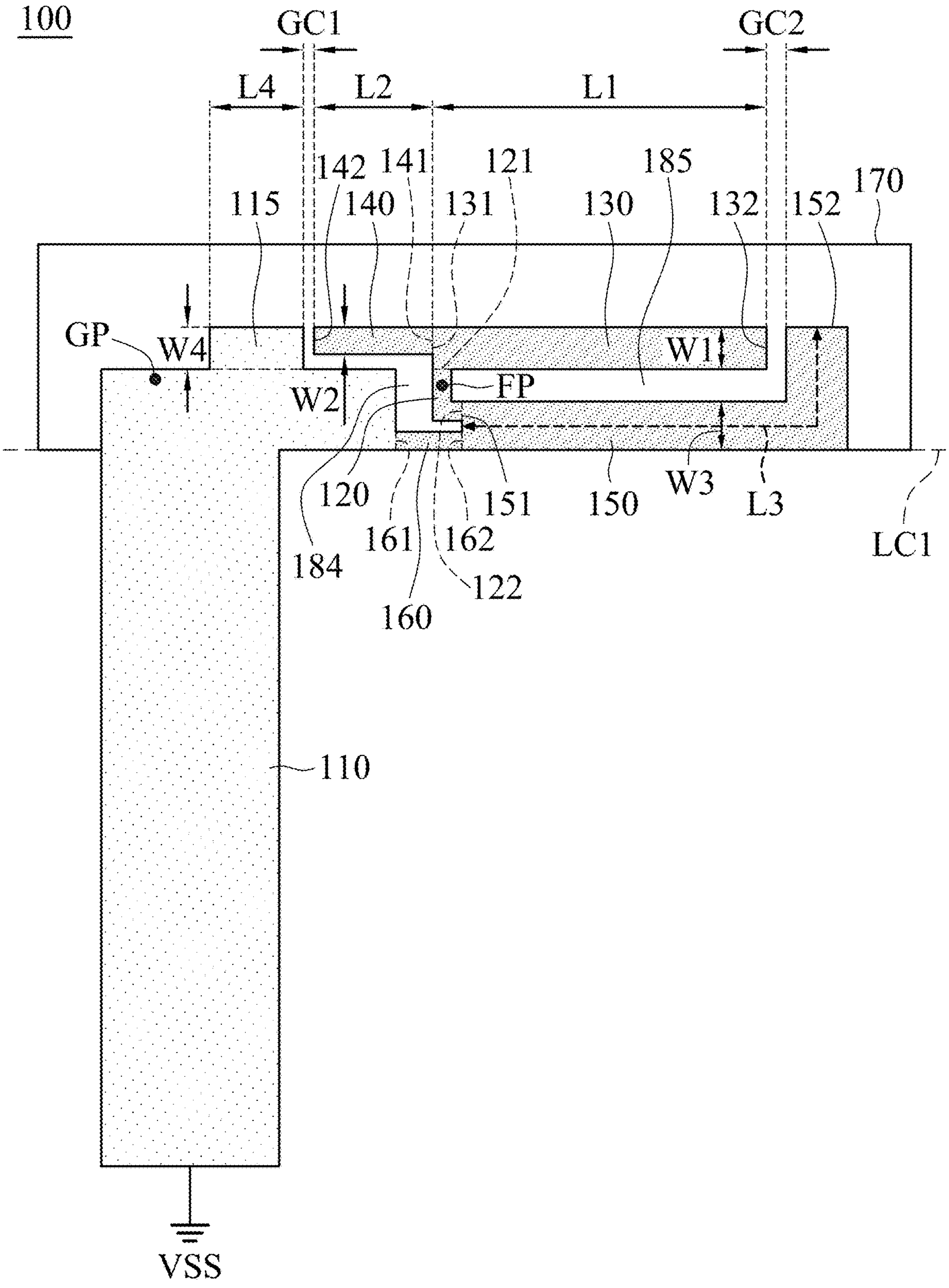
FIG. 1 is a flat expansion view of an antenna structure according to an embodiment of the invention.

In order to illustrate the purposes, features and advantages of the invention, the embodiments and figures of the invention are shown in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Furthermore, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a flat expansion view of an antenna structure 100 according to an embodiment of the invention. The antenna structure 100 may be applied to a mobile device, such as a smart phone, a tablet computer, a notebook computer, a wireless access point, a router, or any device with a communication function. Alternatively, the antenna structure 100 may be applied to an electronic device, such as any unit of IOT (Internet of Things).

In the embodiment of FIG. 1, the antenna structure 100 includes a ground element 110, a feeding radiation element 120, a first radiation element 130, a second radiation element 140, a third radiation element 150, a shorting radiation element 160, and a carrier element 170. The ground element 110, the feeding radiation element 120, the first radiation element 130, the second radiation element 140, the third radiation element 150, and the shorting radiation element 160 may all be made of metal materials, such as copper, silver, aluminum, iron, or an alloy thereof.

The ground element 110 is coupled to a ground voltage VSS. In some embodiments, the ground voltage VSS is provided by a system ground plane (not shown). The ground element 110 includes a protruding portion 115. For example, the protruding portion 115 of the ground element 110 may substantially have a rectangular shape or a square shape, but it is not limited thereto. In addition, a grounding point GP is adjacent to the protruding portion 115 of the ground element 110. It should be noted that the term "adjacent" or "close" over the disclosure means that the distance between (or the spacing of) two corresponding elements is smaller than a predetermined distance (e.g., 10 mm or the shorter), but it often does not mean that the two corresponding elements directly touch each other (i.e., the aforementioned distance/space between them is reduced to 0).

The feeding radiation element 120 may substantially have a relatively small L-shape. Specifically, the feeding radiation element 120 has a first end 121 and a second end 122. A feeding point FP may be substantially positioned at the center of the feeding radiation element 120. The feeding point FP may be further coupled to a positive electrode of a signal source (not shown). A negative electrode of the signal source may be coupled to the grounding point GP. For example, the signal source may be an RF (Radio Frequency) module for exciting the antenna structure 100. In some embodiments, the antenna structure 100 further includes a coaxial cable with a central conductor and a conductive housing. The positive electrode of the signal source may be coupled through the central conductor of the coaxial cable to the feeding point FP. The negative electrode of the signal source may be coupled through the conductive housing of the coaxial cable to the grounding point GP.

The first radiation element 130 may substantially have a relatively wide straight-line shape. Specifically, the first radiation element 130 has a first end 131 and a second end 132. The first end 131 of the first radiation element 130 is coupled to the first end 121 of the feeding radiation element 120. The second end 132 of the first radiation element 130 is an open end.

The second radiation element 140 may substantially have a relatively narrow straight-line shape. The width W1 of the first radiation element 130 may be greater than the width W2 of the second radiation element 140. Specifically, the second radiation element 140 has a first end 141 and a second end 142. The first end 141 of the second radiation element 140 is coupled to the first end 131 of the first radiation element 130. The second end 142 of the second radiation element 140 is an open end. For example, the second end 132 of the first radiation element 130 and the second end 142 of the second radiation element 140 may substantially extend in opposite directions and away from each other. In some embodiments, the combination of the feeding radiation element 120, the first radiation element 130, and the second radiation element 140 substantially has a T-shape. In some embodiments, the second end 142 of the second radiation element 140 is adjacent to the protruding portion 115 of the ground element 110. A first coupling gap GC1 may be formed between the protruding portion 115 of the ground element 110 and the second radiation element 140.

The third radiation element 150 may substantially have a relatively large L-shape (compared with the feeding radiation element 120). Specifically, the third radiation element 150 has a first end 151 and a second end 152. The first end 151 of the third radiation element 150 is coupled to the second end 122 of the feeding radiation element 120. The second end 152 of the third radiation element 150 is an open end. In some embodiments, the second end 152 of the third radiation element 150 is adjacent to the second end 132 of the first radiation element 130. A second coupling gap GC2 may be formed between the first radiation element 130 and the third radiation element 150.

The shorting radiation element 160 may substantially have a relatively short straight-line shape (compared with the first radiation element 130 and the second radiation element 140). Specifically, the shorting radiation element 160 has a first end 161 and a second end 162. The first end 161 of the shorting radiation element 160 is coupled to the ground element 110. The second end 162 of the shorting radiation element 160 is coupled to the first end 151 of the third radiation element 150. That is, the third radiation element 150 is further coupled through the shorting radiation element 160 to the ground element 110.

In some embodiments, a first open slot region 184 is defined by the ground element 110, the feeding radiation element 120, the second radiation element 140, and the shorting radiation element 160. For example, the first open slot region 184 may substantially have a W-shape, but it is not limited thereto.

In some embodiments, a second open slot region 185 is defined by the feeding radiation element 120, the first radiation element 130, and the third radiation element 150. For example, the second open slot region 185 may substantially have an L-shape, but it is not limited thereto.

The ground element 110, the feeding radiation element 120, the first radiation element 130, the second radiation element 140, the third radiation element 150, and the shorting radiation element 160 may all be disposed on the same surface of the carrier element 170. The ground element 110 may also extend beyond the carrier element 170. The shape and type of the carrier element 170 are not limited in the invention. For example, the carrier element 170 may be an FR4 (Flame Retardant 4) substrate, a PCB (Printed Circuit Board), or an FPC (Flexible Printed Circuit). In some embodiments, the antenna structure 100 is a planar antenna structure. However, in alternative embodiments, the antenna structure 100 is a 3D (Three-Dimensional) antenna structure, which is modified based on a bending line LC1 of FIG. 1.

Figure 2:
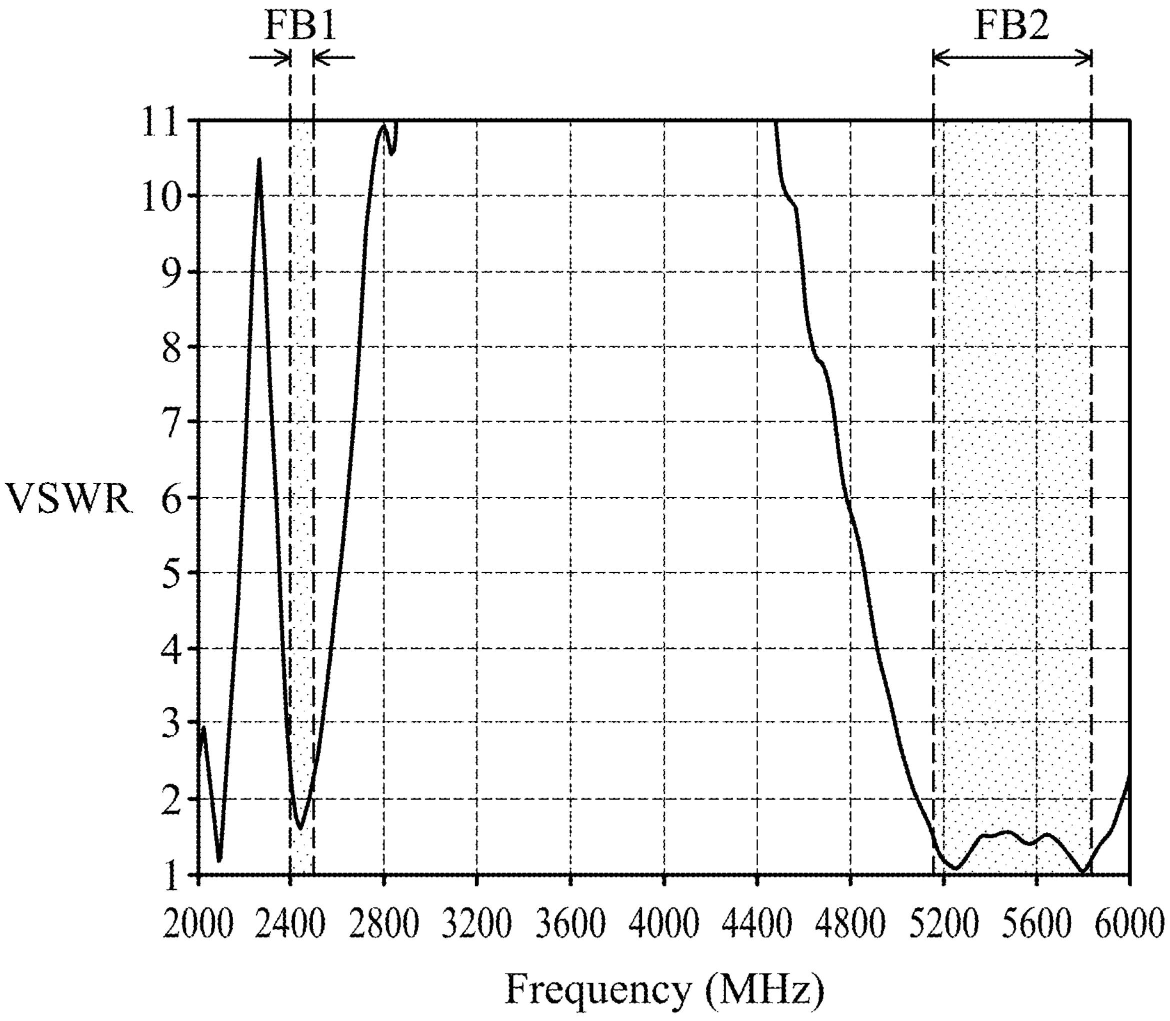
FIG. 2 is a diagram of VSWR (Voltage Standing Wave Ratio) of an antenna structure according to an embodiment of the invention.

FIG. 2 is a diagram of VSWR (Voltage Standing Wave Ratio) of the antenna structure 100 according to an embodiment of the invention. The horizontal axis represents the operational frequency (MHz), and the vertical axis represents the VSWR. According to the measurement of FIG. 2, the antenna structure 100 can cover a first frequency band FB1 and a second frequency band FB2. For example, the first frequency band FB1 may be from 2400 MHz to 2500 MHz, and the second frequency band FB2 may be from 5150 MHz to 5850 MHz. Therefore, the antenna structure 100 can support at least the wideband operations of WLAN (Wireless Local Area Network) 2.4 GHz/5 GHz.

In some embodiments, the operational principles of the antenna structure 100 will be described as follows. The first radiation element 130 is excited by the feeding radiation element 120, so as to generate the first frequency band FB1. Both of the second radiation element 140 and the third radiation element 150 are excited by the feeding radiation element 120, so as to generate the second frequency band FB2. According to practical measurements, the variable-width design of the first radiation element 130 and the second radiation element 140 is configured to increase the operational bandwidth of the antenna structure 100. Furthermore, if the protruding portion 115 is added to the ground element 110, it will be configured to fine-tune the impedance matching of the second frequency band FB2 of the antenna structure 100.

In some embodiments, the element sizes of the antenna structure 100 will be described as follows. The length L1 of the first radiation element 130 may be substantially equal to 0.25 wavelength (λ/4) of the first frequency band FB1 of the antenna structure 100. The width W1 of the first radiation element 130 may be from 1.5 mm to 2 mm. The length L2 of the second radiation element 140 may be substantially equal to 0.25 wavelength (λ/4) of the second frequency band FB2 of the antenna structure 100. The width W2 of the second radiation element 140 may be from 1 mm to 1.5 mm. The length L3 of the third radiation element 150 may be substantially equal to 0.5 wavelength (λ/2) of the second frequency band FB2 of the antenna structure 100. The width W3 of the third radiation element 150 may be from 2 mm to 2.5 mm. In the ground element 110, the length L4 of the protruding portion 115 may be from 3 mm to 5 mm, and the width W4 of the protruding portion 115 may be from 1.5 mm to 2 mm. The width of the first coupling gap GC1 may be from 0.5 mm to 1 mm. The width of the second coupling gap GC2 may be from 0.75 mm to 1.5 mm. The above ranges of element sizes are calculated and obtained according to many experimental results, and they help to optimize the operational bandwidth and the impedance matching of the antenna structure 100.

Figure 3A:
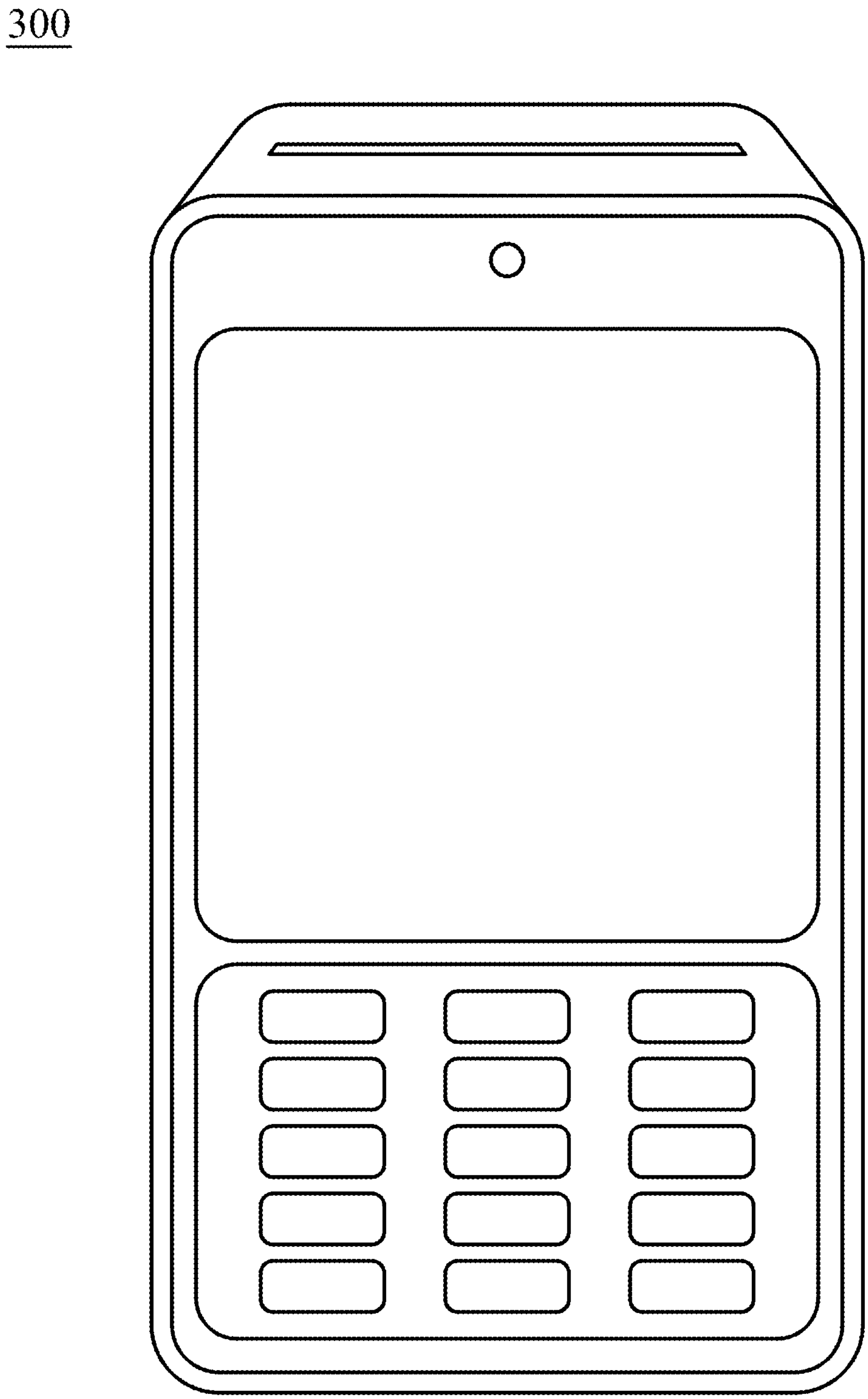
FIG. 3A is a perspective view of a POS (Point of Sale) system according to an embodiment of the invention.
Figure 3B:
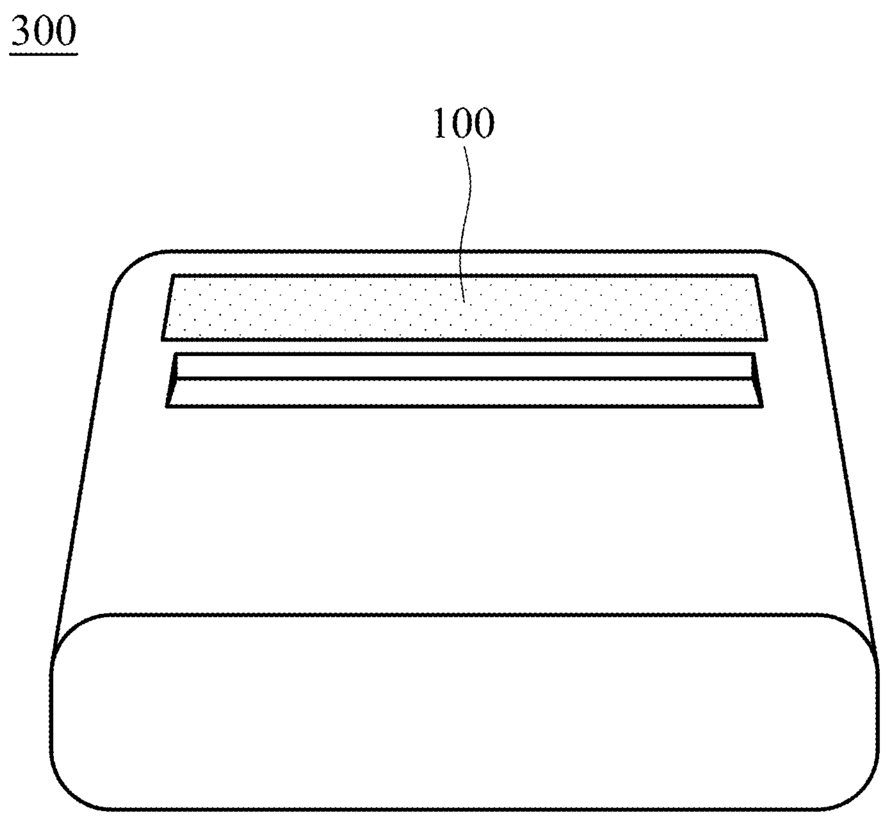
FIG. 3B is a partial view of a POS system according to an embodiment of the invention.

FIG. 3A is a perspective view of a POS (Point of Sale) system 300 according to an embodiment of the invention. FIG. 3B is a partial view of the POS system 300 according to an embodiment of the invention. In the embodiment of FIG. 3A and FIG. 3B, the POS system 300 includes the aforementioned antenna structure 100, and thus the POS system 300 supports the function of wireless communication. In some embodiments, the POS system 300 further includes an RF circuit, a filter, an amplifier, a processor, and/or a housing, but it is not limited thereto. For example, the antenna structure 100 may be disposed on the top of the POS system 300. Even if the POS system 300 further includes some metal elements, they will not negatively affect the communication quality of the antenna structure 100 so much. Other features of the POS system 300 of FIG. 3A and FIG. 3B are similar to those of the antenna structure 100 of FIG. 1. Therefore, the two embodiments can achieve similar levels of performance.

The invention proposes a novel antenna structure. In comparison to the conventional design, the invention has at least the advantages of small size, wide bandwidth, and low environmental interference. Therefore, the invention is suitable for application in a variety of mobile communication devices or the IOT.

Note that the above element sizes, element shapes, and frequency ranges are not limitations of the invention. An antenna designer can fine-tune these settings or values to meet different requirements. It should be understood that the antenna structure of the invention is not limited to the configurations of FIGS. 1-3. The invention may merely include any one or more features of any one or more embodiments of FIGS. 1-3. In other words, not all of the features displayed in the figures should be implemented in the antenna structure of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An antenna structure, comprising:

a ground element, comprising a protruding portion;

a feeding radiation element, having a feeding point;

a first radiation element, coupled to the feeding radiation element;

a second radiation element, coupled to the first radiation element, wherein the second radiation element is adjacent to the protruding portion of the ground element, and the first radiation element and the second radiation element substantially extend in opposite directions;

a third radiation element, coupled to the feeding radiation element, wherein the third radiation element is adjacent to the first radiation element;

a shorting radiation element, wherein the third radiation element is further coupled through the shorting radiation element to the ground element; and a carrier element, wherein the ground element, the feeding radiation element, the first radiation element, the second radiation element, the third radiation element, and the shorting radiation element are disposed on the carrier element.

2. The antenna structure as claimed in claim 1, wherein the protruding portion of the ground element substantially has a rectangular shape.

3. The antenna structure as claimed in claim 1, wherein a combination of the feeding radiation element, the first radiation element, and the second radiation element substantially has a T-shape.

4. The antenna structure as claimed in claim 1, wherein a width of the first radiation element is greater than that of the second radiation element.

5. The antenna structure as claimed in claim 1, wherein a first coupling gap is formed between the protruding portion of the ground element and the second radiation element, and a width of the first coupling gap is from 0.5 mm to 1 mm.

6. The antenna structure as claimed in claim 1, wherein a second coupling gap is formed between the first radiation element and the third radiation element, and a width of the second coupling gap is from 0.75 mm to 1.5 mm.

7. The antenna structure as claimed in claim 1, wherein the antenna structure covers a first frequency band and a second frequency band, the first frequency band is from 2400 MHz to 2500 MHz, and the second frequency band is from 5150 MHz to 5850 MHz.

8. The antenna structure as claimed in claim 7, wherein a length of the first radiation element is substantially equal to 0.25 wavelength of the first frequency band.

9. The antenna structure as claimed in claim 7, wherein a length of the second radiation element is substantially equal to 0.25 wavelength of the second frequency band.

10. The antenna structure as claimed in claim 7, wherein a length of the third radiation element is substantially equal to 0.5 wavelength of the second frequency band.

* * * * *